(12) United States Patent
Ogihara et al.

(10) Patent No.: US 12,668,241 B2
(45) Date of Patent: Jun. 30, 2026

(54) VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

(71) Applicant: TOYOTA JIDOSHA KABUSHIKI KAISHA, Toyota (JP)

(72) Inventors: Takahiko Ogihara, Gotemba (JP); Shogo Ito, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 18/888,583

(22) Filed: Sep. 18, 2024

(65) Prior Publication Data

US 2025/0153713 A1     May 15, 2025

(30) Foreign Application Priority Data

Nov. 15, 2023     (JP) ................................. 2023-194409

(51) Int. Cl.
*B60W 30/14* (2006.01)
*B60W 10/188* (2012.01)
*B60W 30/18* (2012.01)
(52) U.S. Cl.
CPC ........ *B60W 30/146* (2013.01); *B60W 10/188* (2013.01); *B60W 30/18072* (2013.01); *B60W 2540/106* (2013.01)

(58) Field of Classification Search
CPC ............. B60W 30/146; B60W 10/188; B60W 30/18072; B60W 2540/106;
(Continued)

(56) References Cited

U.S. PATENT DOCUMENTS 8,355,851 B2     1/2013   Inoue et al.
8,370,040 B2     2/2013   Inoue et al.
(Continued)

FOREIGN PATENT DOCUMENTS

JP          2015072044 A        4/2015
JP          2017094805 A        6/2017
(Continued)

*Primary Examiner* — Anne Marie Antonucci
*Assistant Examiner* — Luis G Del Valle
(74) *Attorney, Agent, or Firm* — Hunton Andrews Kurth LLP

(57)          ABSTRACT
A vehicle driving assistance apparatus executes a deceleration assistance control of autonomously applying a braking force to an own vehicle to decelerate the own vehicle, and a coasting control of causing the own vehicle to coast. The apparatus executes the coasting control when a predetermined coasting condition becomes satisfied in a situation where the apparatus does not detect a deceleration target which creates a need to decelerate the own vehicle. The vehicle driving assistance apparatus executes the deceleration assistance control when the apparatus detects the deceleration target in a situation where the predetermined coasting condition is not satisfied. The apparatus determines whether to execute the coasting control depending on driving operation information on a driving operation carried out by an operator of the own vehicle when the apparatus detects the deceleration target in a situation where the predetermined coasting condition is satisfied.

10 Claims, 2 Drawing Sheets

(58) Field of Classification Search
CPC ....... B60W 2520/105; B60W 2540/10; B60W 2540/12; B60W 2030/1809
See application file for complete search history.

(56) References Cited

U.S. PATENT DOCUMENTS

|                |   |          |                       |
|----------------|---|----------|-----------------------|
| 8,417,430 B2   |   | 4/2013   | Saeki                 |
| 8,548,709 B2   |   | 10/2013  | Morita                |
| 8,768,597 B2   |   | 7/2014   | Kagawa                |
| 9,174,643 B2   |   | 11/2015  | Aso                   |
| 10,017,178 B2  |   | 7/2018   | Morimoto et al.       |
| 10,118,617 B2  |   | 11/2018  | Urano et al.          |
| 10,486,698 B2  |   | 11/2019  | Masui et al.          |
| 11,603,092 B2 *|   | 3/2023   | Ding ...................... G08G 1/143 |
| 2017/0137030 A1 *|  | 5/2017  | Fujita ................... B60W 50/10  |
| 2019/0295419 A1 |  | 9/2019   | Tosa et al.           |

FOREIGN PATENT DOCUMENTS

| JP  | 2018176921 A | 11/2018 |
| --- | ------------ | ------- |
| JP  | 2019137228 A | 8/2019  |
| JP  | 6694835 B2   | 4/2020  |

* cited by examiner

1

VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

CROSS-REFERENCE TO RELATED APPLICATIONS

This application claims priority to Japanese patent application No. JP 2023-194409 filed on Nov. 15, 2023, the content of which is hereby incorporated by reference in its entirety.

BACKGROUND

Field

The present invention relates to a vehicle driving assistance apparatus, a vehicle driving assistance method, and a computer-readable storage medium storing a vehicle driving assistance program.

Description of the Related Art

There is known a vehicle driving assistance apparatus which is configured to reduce an amount of energy consumed by a driving apparatus of a vehicle by performing a coasting control of causing the vehicle to coast to decelerate the vehicle (for example, refer to JP 2015-72044 A).

There is also known a vehicle driving assistance apparatus which is configured to execute a deceleration assistance control to autonomously decelerate the vehicle when the vehicle needs to be decelerated, such as when the vehicle approaches too close to a preceding vehicle. With such a vehicle driving assistance apparatus, in a situation where the coasting control may be executed or continued, the coasting control may not be executed or the coasting control may be stopped and the deceleration assistance control may be executed.

SUMMARY

An object of the present invention is to provide a vehicle driving assistance apparatus, a vehicle driving assistance method, and a computer-readable storage medium storing a vehicle driving assistance program which can execute the coasting control without executing the deceleration assistance control or continue executing the coasting control depending on a situation of an own vehicle.

A vehicle driving assistance apparatus according to the present invention comprises an electronic control unit. The electronic control unit which executes a deceleration assistance control of autonomously applying a braking force to an own vehicle to decelerate the own vehicle, and a coasting control of causing the own vehicle to coast. The electronic control unit is configured to execute the coasting control when a predetermined coasting condition becomes satisfied in a situation where the electronic control unit does not detect a deceleration target which creates a need to decelerate the own vehicle. Further, the electronic control unit is configured to execute the deceleration assistance control when the electronic control unit detects the deceleration target in a situation where the predetermined coasting condition is not satisfied. Furthermore, the electronic control unit is configured to determine whether to execute the coasting control depending on driving operation information on a driving operation carried out by an operator of the own vehicle when the electronic control unit detects the deceleration target in a situation where the predetermined coasting condition is satisfied.

When the deceleration target is detected in the situation where the predetermined coasting condition is satisfied, it may be a situation where the coasting control may be executed instead of the deceleration assistance control or the coasting control may continue being executed.

With the vehicle driving assistance apparatus according to the present invention, when the deceleration target is detected in the situation where the predetermined coasting condition is satisfied, the driving operation information on the driving operation carried out by the operator of the own vehicle is taken into consideration to determine whether to execute the coasting control. In this regard, the driving operation carried out by the operator of the own vehicle reflects situations of the own vehicle at that time. Therefore, the coasting control can be executed without executing the deceleration assistance control or the coasting control can continue being executed depending on the situation of the own vehicle. Thus, the amount of energy consumed to move the own vehicle can be reduced.

A vehicle driving assistance apparatus according to another invention comprises an electronic control unit. The electronic control unit executes a deceleration assistance control of autonomously applying a braking force to an own vehicle to decelerate the own vehicle, and a coasting control of causing the own vehicle to coast. The electronic control unit is configured to execute the coasting control when a coasting condition becomes satisfied in a situation where the electronic control unit does not detect a deceleration object which creates a need to decelerate the own vehicle. The coasting condition being a condition that an accelerator pedal and a brake pedal of the own vehicle are both released. Further, the electronic control unit is configured to execute the deceleration assistance control when the electronic control unit detects the deceleration object in a situation where the coasting condition is not satisfied. Furthermore, the electronic control unit is configured to execute the coasting control when the electronic control unit detects the deceleration object in a situation where the coasting condition is satisfied, and a required deceleration rate of the own vehicle is equal to or smaller than a predetermined coasting deceleration rate. The required deceleration rate being a deceleration rate of the own vehicle required at a point of time when the electronic control unit detects the deceleration object. Further, the electronic control unit is configured to execute the deceleration assistance control when the electronic control unit detects the deceleration object in the situation where the coasting condition is satisfied, and the required deceleration rate is equal to or greater than a predetermined braking deceleration rate which is greater than the predetermined coasting deceleration rate.

When the deceleration target is detected in the situation where the coasting condition is satisfied, it may be a situation where the coasting control may be executed instead of the deceleration assistance control or the coasting control may continue being executed.

With the vehicle driving assistance apparatus according to the present invention, when the deceleration target is detected in the situation where the coasting condition is satisfied, and the required deceleration rate of the own vehicle required at a point of time when the deceleration target is detected, is equal to or smaller than the predetermined coasting deceleration rate, the coasting control is executed. When the deceleration target is detected in the situation where the coasting condition is satisfied, and the required deceleration rate is equal to or greater than the predetermined braking deceleration rate which is greater than the predetermined coasting deceleration rate, the deceleration assistance control is executed. In this regard, the required deceleration rate of the own vehicle required at the point of time when the deceleration target is detected, reflects the situation of the own vehicle at that time. Therefore, the coasting control can be executed without executing the deceleration assistance control or the coasting control can continue being executed depending on the situation of the own vehicle. Therefore, the amount of energy consumed to move the own vehicle can be reduced.

A vehicle driving assistance method according the present invention is a method for executing a deceleration assistance control of autonomously applying a braking force to an own vehicle to decelerate the own vehicle, and a coasting control of causing the own vehicle to coast. The vehicle driving assistance method comprises a step of executing the coasting control when a predetermined coasting condition becomes satisfied in a situation where a deceleration target which creates a need to decelerate the own vehicle, is not detected. Further, the vehicle driving assistance method comprises a step of executing the deceleration assistance control when the deceleration target is detected in a situation where the predetermined coasting condition is not satisfied. Furthermore, the vehicle driving assistance method comprises a step of determining whether to execute the coasting control depending on driving operation information on a driving operation carried out by an operator of the own vehicle when the deceleration target is detected in a situation where the predetermined coasting condition is satisfied.

With the vehicle driving assistance method according to the present invention, for the same reason as described above, the coasting control can be executed without executing the deceleration assistance control or the coasting control can continue being executed depending on the situation of the own vehicle. Therefore, the amount of energy consumed to move the own vehicle can be reduced.

A computer-readable storage medium according to the present invention stores a vehicle driving assistance program. The vehicle driving assistance program executes a deceleration assistance control of autonomously applying a braking force to an own vehicle to decelerate the own vehicle and a coasting control of causing the own vehicle to coast. The vehicle driving assistance program is configured to execute the coasting control when a predetermined coasting condition becomes satisfied in a situation where a deceleration target which creates a need to decelerate the own vehicle, is not detected. Further, the vehicle driving assistance program is configured to execute the deceleration assistance control when the deceleration target is detected in a situation where the predetermined coasting condition is not satisfied. Furthermore, the vehicle driving assistance program is configured to determine whether to execute the coasting control depending on driving operation information on a driving operation carried out by an operator of the own vehicle when the deceleration target is detected in a situation where the predetermined coasting condition is satisfied.

With the vehicle driving assistance program according to the present invention, for the same reason as described above, the coasting control can be executed without executing the deceleration assistance control or the coasting control can continue being executed depending on the situation of the own vehicle. Therefore, the amount of energy consumed to move the own vehicle can be reduced.

Elements of the invention are not limited to elements of embodiments and modified examples of the invention described with reference to the drawings. The other objects, features and accompanied advantages of the invention can be easily understood from the embodiments and the modified examples of the invention.

DETAILED DESCRIPTION

Figure 1:
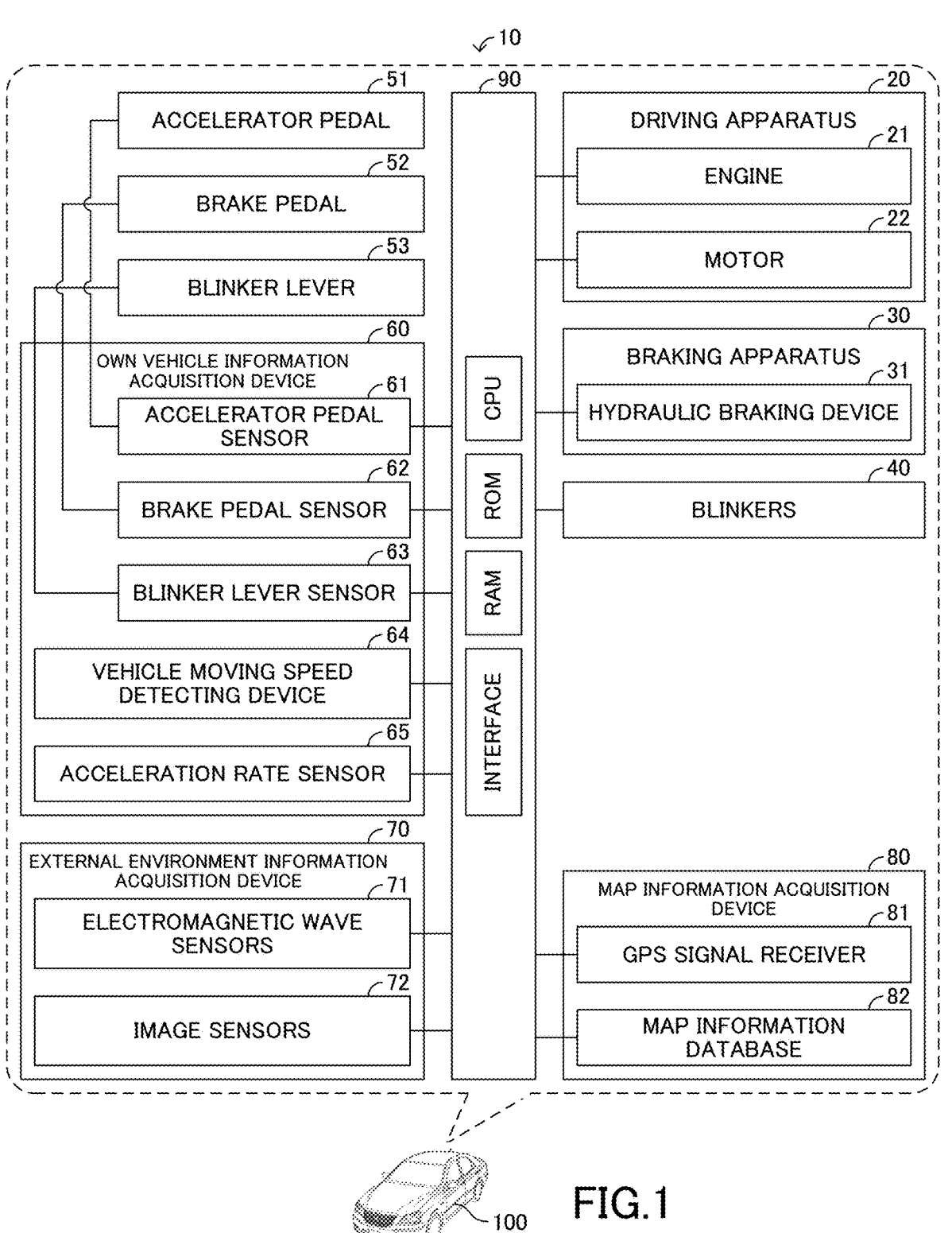
FIG. 1 is a view which illustrates a vehicle driving assistance apparatus according to an embodiment of the present invention.

Below, a vehicle driving assistance apparatus, a vehicle driving assistance method, and a computer-readable storage medium storing a vehicle driving assistance program according to an embodiment of the present invention will be described with reference to the drawings. FIG. 1 illustrates the vehicle driving assistance apparatus 10 according to the embodiment of the present invention. The vehicle driving assistance apparatus 10 is mounted on an own vehicle 100. Hereinafter, the vehicle driving assistance apparatus 10 will be described by exemplifying a situation where an operator of the own vehicle 100 is a driver of the own vehicle 100, i.e., a person who rides on the own vehicle 100 and drives the own vehicle 100.

However, the operator of the own vehicle 100 may be a remote operator of the own vehicle 100, i.e., a person who is not in the own vehicle 100 but remotely drives the own vehicle 100. When the operator of the own vehicle 100 is the remote operator, the vehicle driving assistance apparatuses 10 are mounted on the own vehicle 100 and a remote control facility installed outside the own vehicle 100 for remotely driving the own vehicle 100, respectively and functions of the vehicle driving assistance apparatus 10 described below are shared by the vehicle driving assistance apparatus 10 mounted on the own vehicle 100 and the vehicle driving assistance apparatus 10 mounted on the remote control facility.

As illustrated in FIG. 1, the vehicle driving assistance apparatus 10 includes an ECU (electronic control device) 90 as a control device. The ECU 90 includes a microcomputer as a main component. The microcomputer includes a CPU, a storage medium such as ROM, RAM and a non-volatile memory, an interface, and the like. The CPU implements various functions by executing instructions, or programs, or routines stored in the computer-readable storage medium. In particular, in the present embodiment, the vehicle driving assistance apparatus 10 stores programs for executing a coasting control and a deceleration assistance control, which will be described later, in the storage medium.

Further, the own vehicle 100 is equipped with a driving apparatus 20 and a braking apparatus 30. The driving apparatus 20 is an apparatus which generates a driving force applied to the own vehicle 100, and includes an internal combustion engine 21 and at least one electric motor 22 in the present embodiment. The driving apparatus 20 is electrically connected to the ECU 90. The vehicle driving assistance apparatus 10 can control the driving force applied to the own vehicle 100 by controlling operations of the driving apparatus 20. The braking apparatus 30 is an apparatus which applies a braking force to the own vehicle 100, and includes a hydraulic braking device 31 in the present embodiment. The braking apparatus 30 is electrically connected to the ECU 90. The vehicle driving assistance apparatus 10 can control the braking force applied to the own vehicle 100 by controlling operations of the braking apparatus 30.

Further, the own vehicle 100 is equipped with blinkers 40, an accelerator pedal 51, a brake pedal 52, a blinker lever 53, an own vehicle information acquisition device 60, an external environment information acquisition device 70, and a map information acquisition device 80.

The blinkers 40 are devices which indicate a direction of travel of the own vehicle 100, and are mounted on a left front corner portion, a right front corner portion, a left rear corner portion, and a right rear corner portion of the own vehicle 100, respectively. The blinkers 40 are electrically connected to the ECU 90.

The own vehicle information acquisition device 60 is a device which acquires information related to the own vehicle 100, and in the present embodiment, includes an accelerator pedal sensor 61, a brake pedal sensor 62, a blinker lever sensor 63, a vehicle moving speed detecting device 64, and an acceleration rate sensor 65.

The accelerator pedal sensor 61 is a sensor which detects accelerator pedal operation information (i.e., information related to an operation applied to the accelerator pedal 51). The accelerator pedal sensor 61 is electrically connected to the ECU 90. The vehicle driving assistance apparatus 10 acquires the accelerator pedal operation information as the own vehicle information IV by the accelerator pedal sensor 61. The accelerator pedal operation information is, for example, information regarding whether or not the accelerator pedal 51 is depressed, and an accelerator pedal operation amount AP (i.e., an operation amount of the accelerator pedal 51).

The brake pedal sensor 62 is a sensor which detects brake pedal operation information (i.e., information related to an operation applied to the brake pedal 52). The brake pedal sensor 62 is electrically connected to the ECU 90. The vehicle driving assistance apparatus 10 acquires the brake pedal operation information as the own vehicle information IV by the brake pedal sensor 62. The brake pedal operation information is, for example, information regarding whether or not the brake pedal 52 is depressed, and a brake pedal operation amount BP (i.e., an operation amount of the brake pedal 52).

The blinker lever sensor 63 is a sensor which detects blinker lever operation information (i.e., information on an operation on the blinker lever 53). The blinker lever sensor 63 is electrically connected to the ECU 90. The vehicle driving assistance apparatus 10 acquires the blinker lever operation information as the own vehicle information IV by the blinker lever sensor 63. When the blinker lever 53 is operated, the vehicle driving assistance apparatus 10 causes the predetermined blinkers 40 to blink in accordance with the operation.

The vehicle moving speed detecting device 64 is a device that detects a moving speed of the own vehicle 100, and includes, for example, wheel rotation speed sensors. The vehicle moving speed detecting device 64 is electrically connected to the ECU 90. The vehicle driving assistance apparatus 10 acquires the moving speed of the own vehicle 100 as an own vehicle moving speed V by the vehicle moving speed detecting device 64. The own vehicle moving speed V is the own vehicle information IV.

The acceleration rate sensor 65 is a sensor which acquires an acceleration rate of the own vehicle 100 in a longitudinal direction of the own vehicle 100. The acceleration rate sensor 65 is electrically connected to the ECU 90. The vehicle driving assistance apparatus 10 acquires the acceleration rate of the own vehicle 100 in the longitudinal direction of the own vehicle 100 as a longitudinal acceleration rate Gx by the acceleration rate sensor 65. The longitudinal acceleration rate Gx is the own vehicle information IV.

The external environment information acquisition device 70 is a device which acquires information around the own vehicle 100 as external environment information IS, and includes electromagnetic wave sensors 71 and imaging sensors 72 in the present embodiment.

The electromagnetic wave sensor 71 transmits electromagnetic waves. When the transmitted electromagnetic waves (i.e., transmitted waves) are reflected by an object and arrives at the electromagnetic wave sensor 71, the electromagnetic wave sensor 71 receives the arrived electromagnetic waves as reflected waves. The electromagnetic wave sensor 71 is, for example, a radar sensor such as a millimeter wave radar. The electromagnetic wave sensors 71 are electrically connected to the ECU 90. The vehicle driving assistance apparatus 10 acquires, by the electromagnetic wave sensors 71, information related to objects existing around the own vehicle 100 as object information IO. The object information IO is the external environment information IS.

The image sensors 72 image views around the own vehicle 100. The image sensor 72 is, for example, a camera sensor. The image sensors 72 are electrically connected to the ECU 90. The vehicle driving assistance apparatus 10 acquires information on images of the views around the own vehicle 100 as image information IC by the image sensors 72. The image information IC is the external environment information IS.

The map information acquisition device 80 is a device which acquires map information on an area around the own vehicle 100, and includes a GPS signal receiver 81 and a map information database 82 in the present embodiment.

The GPS signal receiver 81 is a device which receives GPS signals. The GPS signal receiver 81 is electrically connected to the ECU 90. The vehicle driving assistance apparatus 10 acquires a present position of the own vehicle 100 based on the GPS signals received by the GPS signal receiver 81.

The map information database 82 is a device which stores map information. The map information database 82 is electrically connected to the ECU 90. The vehicle driving assistance apparatus 10 acquires, as map information IM, the map information on the area around the own vehicle 100 from the map information database 82 based on the present position of the own vehicle 100 acquired based on the GPS signals.

<Operations of Vehicle Driving Assistance Apparatus>

Figure 2:
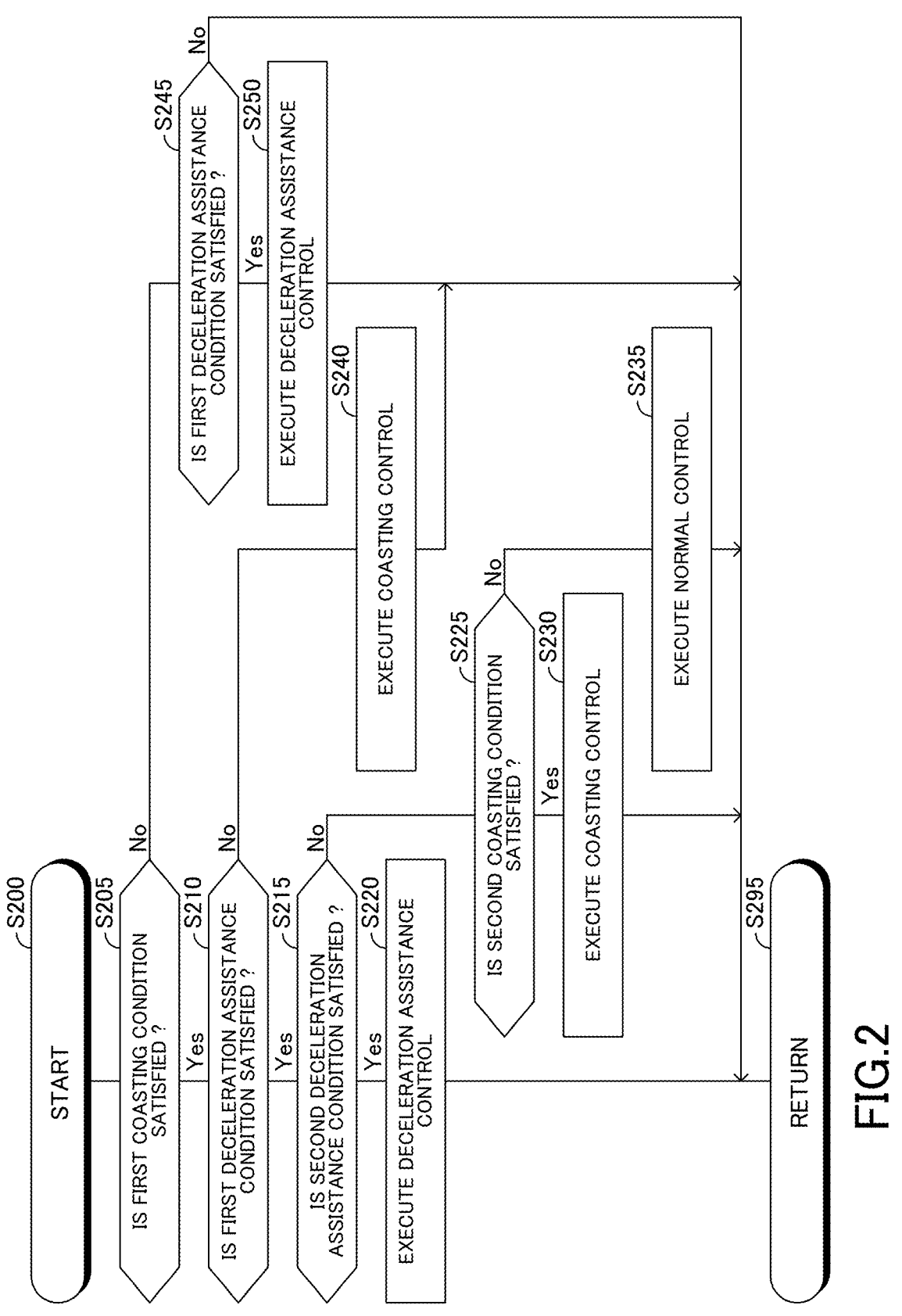
FIG. 2 is a view which illustrates a flowchart showing a routine executed by the vehicle driving assistance apparatus according to the embodiment of the present invention.

Next, operations of the vehicle driving assistance apparatus 10 will be described. The vehicle driving assistance apparatus 10 executes a routine illustrated in FIG. 2 at predetermined time intervals. Therefore, at a predetermined timing, the vehicle driving assistance apparatus 10 starts a process from a step S200 of the routine illustrated in FIG. 2 and proceeds with the process to a step S205 to determine whether or not a first coasting condition CC1 is satisfied.

The first coasting condition CC1 is a condition that the accelerator pedal 51 and the brake pedal 52 are both released from being depressed. The vehicle driving assistance apparatus 10 determines whether or not the first coasting condition CC1 is satisfied based on the own vehicle information IV.

When the vehicle driving assistance apparatus 10 determines "No" at the step S205, the vehicle driving assistance apparatus 10 proceeds with the process to a step S245 to determine whether or not a first deceleration assistance condition CD1 is satisfied.

The first deceleration assistance condition CD1 is a condition that a deceleration target Td is detected. The deceleration target Td is a target T which causes a need to decelerate the own vehicle 100. The target T which can be the deceleration target Td is, for example, a preceding vehicle located in front of the own vehicle 100, a traffic light in front of the own vehicle 100 in a moving direction of the own vehicle 100, a curved road in front of the own vehicle 100 in the moving direction of the own vehicle 100, and a stop point in front of the own vehicle 100 in the moving direction of the own vehicle 100. The vehicle driving assistance apparatus 10 detects the deceleration target Td based on the external environment information IS and the map information IM.

The vehicle driving assistance apparatus 10 determines whether or not the target T is an object which needs to decelerate the own vehicle 100 based on a distance from the own vehicle 100 to the target T, a type of the target T (whether the target T is the preceding vehicle, the traffic light, the curved road, or the stop point), a state of the target T (a moving speed of the preceding vehicle, a lighting state of a stop lamp provided at a rear portion of the preceding vehicle, a lighting state of the traffic light, and a curvature of the curved road), a state of the own vehicle 100 (the own vehicle moving speed V, the longitudinal acceleration rate Gx, whether or not the accelerator pedal 51 is depressed, whether or not the brake pedal 52 is depressed, the accelerator pedal operation amount AP, and the brake pedal operation amount BP), and the like.

The vehicle driving assistance apparatus 10 acquires the type and state of the target T based on the external environment information IS and the map information IM. Further, the vehicle driving assistance apparatus 10 acquires the state of the own vehicle 100 based on the own vehicle information IV.

For example, when a front inter-vehicle distance DF (a distance between the own vehicle 100 and the preceding vehicle) becomes equal to or smaller than a predetermined front inter-vehicle distance DFth, the vehicle driving assistance apparatus 10 detects the preceding vehicle as the deceleration target Td. In addition, when a traffic light distance DS (a distance between the own vehicle 100 and the traffic light) becomes equal to or smaller than a predetermined traffic light distance DSth and the traffic light is turning red, the vehicle driving assistance apparatus 10 detects the traffic light as the deceleration target Td. When a curved road distance DC (a distance between the own vehicle 100 and an entrance of the curved road) becomes equal to or smaller than a predetermined curved road distance DCth, the vehicle driving assistance apparatus 10 detects the curved road as the deceleration target Td.

The vehicle driving assistance apparatus 10 acquires the front inter-vehicle distance DF, the traffic light distance DS, and the curved road distance DC based on the external environment information IS and the map information IM, and determines whether or not the traffic light is turning red based on the external environment information IS.

When the vehicle driving assistance apparatus 10 determines "Yes" at the step S245, the vehicle driving assistance apparatus 10 proceeds with the process to a step S250 to execute the deceleration assistance control. Next, the vehicle driving assistance apparatus 10 proceeds with the process to a step S295 to terminate executing this routine once.

The deceleration assistance control is an automatic driving control or an autonomous driving control, and is a control of autonomously applying the braking force to the own vehicle 100 to decelerate the own vehicle 100.

As described above, the vehicle driving assistance apparatus 10 executes the deceleration assistance control when the vehicle driving assistance apparatus 10 detects the deceleration target Td in a situation where the first coasting condition CC1 is not satisfied.

On the other hand, when the vehicle driving assistance apparatus 10 determines "No" at the step S245, the vehicle driving assistance apparatus 10 directly proceeds with the process to the step S295 to terminate executing this routine once.

When the vehicle driving assistance apparatus 10 determines "Yes" at the step S205, the vehicle driving assistance apparatus 10 proceeds with the process to a step S210 to determines whether or not the first deceleration assistance condition CD1 is satisfied.

When the vehicle driving assistance apparatus 10 determines "No" at the step S210, the vehicle driving assistance apparatus 10 proceeds with the process to a step S240 to executes the coasting control. Next, the vehicle driving assistance apparatus 10 proceeds with the process to the step S295 to terminate executing this routine once.

The coasting control is a control of causing the own vehicle 100 to coast by interrupting a transmission path of the driving force from the driving apparatus 20 to driving wheels of the own vehicle 100.

As described above, the vehicle driving assistance apparatus 10 is configured to execute the coasting control when the first coasting condition CC1 is satisfied in a situation where the vehicle driving assistance apparatus 10 does not detect the deceleration target Td.

On the other hand, when the vehicle driving assistance apparatus 10 determines "Yes" at the step S210, the vehicle driving assistance apparatus 10 proceeds with the process to a step S215 to determine whether or not a second deceleration assistance condition CD2 is satisfied.

The second deceleration assistance condition CD2 is a condition that a level of necessity of decelerating the own vehicle 100 with respect to the deceleration target Td is equal to or higher than a predetermined level. In other words, the second deceleration assistance condition CD2 is a condition that a required deceleration rate GD of the own vehicle 100 required at a point of time when the vehicle driving assistance apparatus 10 detects the deceleration target Td, is equal to or greater than a predetermined braking deceleration rate GDb_th.

For example, when the front inter-vehicle distance DF becomes extremely short, the level of the necessity of decelerating the own vehicle 100 with respect to the preceding vehicle becomes equal to or higher than the predetermined level. In addition, when another vehicle enters a point in front of the own vehicle 100 close to the own vehicle 100, the level of the necessity of decelerating the own vehicle 100 with respect to the other vehicle is equal to or higher than the predetermined level.

The vehicle driving assistance apparatus 10 determines whether or not the second deceleration assistance condition CD2 is satisfied based on the own vehicle information IV, the external environment information IS, and the map information IM.

When the vehicle driving assistance apparatus 10 determines "Yes" at the step S215, the vehicle driving assistance apparatus 10 proceeds with the process to a step S220 to execute the deceleration assistance control. Next, the vehicle driving assistance apparatus 10 proceeds with the process to the step S295 to terminate executing this routine once.

On the other hand, when the vehicle driving assistance apparatus 10 determines "No" at the step S215, the vehicle driving assistance apparatus 10 proceeds with the process to a step S225 to determine whether or not a second coasting condition CC2 is satisfied.

The second coasting condition CC2 is a condition that the required deceleration rate GD of the own vehicle 100 required at the point of time when the vehicle driving assistance apparatus 10 detects the deceleration target Td, is equal to or smaller than a predetermined coasting deceleration rate GDc_th which is smaller than the predetermined braking deceleration rate GDb_th. For example, the second coasting condition CC2 is a condition that at least one of a first condition C1 to a third condition C3 described below is satisfied.

The first condition C1 is a condition that the driver is aware that the own vehicle 100 needs to be decelerated. In other words, the first condition C1 is a condition that, if the deceleration assistance control is executed, there is a possibility that a driver's driving operation may be hindered.

For example, the vehicle driving assistance apparatus 10 determines that the first condition C1 is satisfied when the driver indicates a deceleration intention (for example, the accelerator pedal 51 is released or the like) in a situation where the front inter-vehicle distance DF is shorter than the predetermined front inter-vehicle distance DFth, or when the driver indicates the deceleration intention in a situation where the preceding vehicle is expected to leave an own vehicle moving lane (i.e., a traffic lane on which the own vehicle 100 is moving).

The vehicle driving assistance apparatus 10 determines whether or not the first condition C1 is satisfied based on the own vehicle information IV, the external environment information IS, and the map information IM.

The second condition C2 is a condition that the driver may feel dangerous if the deceleration assistance control is executed and the own vehicle 100 is decelerated. In other words, the second condition C2 is a condition that, if the deceleration assistance control is executed, there is a possibility that a traffic flow of vehicles behind the own vehicle 100 may be disturbed.

For example, the vehicle driving assistance apparatus 10 determines that the second condition C2 is satisfied when a following vehicle is located close to the own vehicle 100 and the following vehicle is moving at a higher speed than the own vehicle 100 when the preceding vehicle and the following vehicle are present. More specifically, the vehicle driving assistance apparatus 10 determines that the second condition C2 is satisfied when a rear inter-vehicle distance DR (a distance between the following vehicle and the own vehicle 100) is equal to or smaller than a predetermined rear inter-vehicle distance DRth and a difference in a moving speed of the following vehicle with respect to the own vehicle moving speed V is equal to or greater than a predetermined value when the preceding vehicle and the following vehicle are present.

The vehicle driving assistance apparatus 10 determines whether or not the second condition C2 is satisfied based on the own vehicle information IV, the external environment information IS, and the map information IM.

The third condition C3 is a condition that the driver feels that an execution of the deceleration assistance control is unnecessary if the deceleration assistance control is executed and the own vehicle 100 is decelerated.

For example, when the driver indicates a deceleration intention (for example, releasing the accelerator pedal 51 or operating the blinkers 40 of the own vehicle 100) when there are a plurality of traffic lanes (traffic lanes in which the own vehicle 100 can move) that can move in front of an entry intersection (an intersection where the own vehicle 100 is going to enter), the vehicle driving assistance apparatus 10 determines that the third condition C3 is satisfied. Alternatively, when the driver indicates the deceleration intention when the own vehicle 100 does not need to stop for turning right or left at the entry intersection, the vehicle driving assistance apparatus 10 determines that the third condition C3 is satisfied. Alternatively, when the driver indicates the deceleration intention when the own vehicle 100 can pass through the traffic light before the traffic light turns red even if the coasting control is executed, the vehicle driving assistance apparatus 10 determines that the third condition C3 is satisfied. Alternatively, when the driver indicates the deceleration intention after the own vehicle 100 passes through a point having a greatest curvature while the own vehicle 100 is moving on the curved road, the vehicle driving assistance apparatus 10 determines that the third condition C3 is satisfied. Alternatively, the vehicle driving assistance apparatus 10 determines that the third condition C3 is satisfied when the driver indicates the deceleration intention when a variation range of the front inter-vehicle distance DF, a variation range of the rear inter-vehicle distance DR, a variation range of a difference in the moving speed of the preceding vehicle with respect to the own vehicle moving speed V, and a variation range of a difference in the moving speed of the following vehicle with respect to the own vehicle moving speed V are equal to or smaller than reference values, respectively in a situation where the preceding vehicle and the succeeding vehicle are present and the own vehicle 100 is moving on the curved road.

The vehicle driving assistance apparatus 10 determines whether or not the third condition C3 is satisfied based on the own vehicle information IV, the external environment information IS, and the map information IM.

When the vehicle driving assistance apparatus 10 determines "Yes" in the step S225, the vehicle driving assistance apparatus 10 proceeds with the process to a step S230 to execute the coasting control. Next, the vehicle driving assistance apparatus 10 proceeds with the process to the step S295 to terminate executing this routine once.

On the other hand, when the vehicle driving assistance apparatus 10 determines "No" at the step S225, the vehicle driving assistance apparatus 10 proceeds with the process to a step S235 to executes a normal control. Next, the vehicle driving assistance apparatus 10 proceeds with the process to the step S295 to terminate executing this routine once.

The normal control is a control of applying the driving force corresponding to the accelerator pedal operation amount AP to the own vehicle 100 and applying the braking force corresponding to the brake pedal operation amount BP to the own vehicle 100. Therefore, when the normal control is executed, the transmission path of the driving force from the driving apparatus 20 to the driving wheels of the own vehicle 100 is established. Therefore, when the accelerator pedal 51 and the brake pedal 52 are released while the normal control is executed, a moving energy for moving the own vehicle 100 is inputted to the driving apparatus 20, and thus the own vehicle 100 is greatly decelerated as compared with when the coasting control is executed.

As described above, the vehicle driving assistance apparatus 10 is configured to determine whether or not to execute the coasting control depending on the driving operation information (i.e., the information related to the driving operation carried out by the driver, for example, the depression release of the accelerator pedal 51) when the vehicle driving assistance apparatus 10 detects the deceleration target Td in a situation where the first coasting condition CC1 is satisfied.

In other words, when the vehicle driving assistance apparatus 10 detects the deceleration target Td in the situation where the first coasting condition CC1 is satisfied, the vehicle driving assistance apparatus 10 is configured to execute the coasting control when the required deceleration rate GD of the own vehicle 100 required at the point of time when the vehicle driving assistance apparatus 10 detects the deceleration target Td, is equal to or smaller than the predetermined coasting deceleration rate GDc_th, and to execute the deceleration assistance control when the required deceleration rate GD is equal to or greater than the predetermined braking deceleration rate GDb_th greater than the predetermined coasting deceleration rate GDc_th.

The operations of the vehicle driving assistance apparatus 10 have been described.

When the deceleration target Td is detected in the situation where the first coasting condition CC1 is satisfied, there is a possibility that the coasting control may be executed instead of the deceleration assistance control, or that the coasting control may be continuously executed.

According to the vehicle driving assistance apparatus 10, when the deceleration target Td is detected in the situation where the first coasting condition CC1 is satisfied, whether or not to execute the coasting control is determined by considering the driving operation information on the driving operation carried out by the driver. In other words, when the deceleration target Td is detected in the situation where the first coasting condition CC1 is satisfied, when the required deceleration rate GD of the own vehicle 100 required at the point of time when the deceleration target Td is detected, is equal to or smaller than the predetermined coasting deceleration rate GDc_th, the coasting control is executed, and when the required deceleration rate GD is equal to or greater than the predetermined braking deceleration rate GDb_th greater than the predetermined coasting deceleration rate GDc_th, the deceleration assistance control is executed.

Here, the driver's driving operation reflects a situation of the own vehicle 100 at that time. In addition, the required deceleration rate GD of the own vehicle 100 required at the point of time when the deceleration target Td is detected, reflects the situation of the own vehicle 100 at that time. Therefore, according to the vehicle driving assistance apparatus 10, it is possible to execute the coasting control without executing the deceleration assistance control, or to continue executing the coasting control depending on the situation of the own vehicle 100. Therefore, an amount of energy consumed to move the own vehicle 100 can be reduced.

It should be noted that the present invention is not limited to the above-described embodiments, and various modifications can be adopted within the scope of the present invention.

What is claimed is:

1. A vehicle driving assistance apparatus, comprising an electronic control unit which executes a deceleration assistance control of autonomously applying a braking force to an own vehicle to decelerate the own vehicle, and a coasting control of causing the own vehicle to coast, wherein the electronic control unit is configured to:
   execute the coasting control when a predetermined coasting condition becomes satisfied in a situation where the electronic control unit does not detect a deceleration target which creates a need to decelerate the own vehicle;
   execute the deceleration assistance control when the electronic control unit detects the deceleration target in a situation where the predetermined coasting condition is not satisfied; and
   determine whether to execute the coasting control depending on driving operation information on a driving operation carried out by an operator of the own vehicle when the electronic control unit detects the deceleration target in a situation where the predetermined coasting condition is satisfied.

2. The vehicle driving assistance apparatus according to claim 1, wherein the predetermined coasting condition is a condition that both an accelerator pedal and a brake pedal of the own vehicle are released.

3. The vehicle driving assistance apparatus according to claim 1, wherein the electronic control unit is configured to:
   obtain a required deceleration rate of the own vehicle required at the point of time when the deceleration target is detected, based on the driver operation information when the deceleration target is detected in a situation where the predetermined coasting condition is satisfied; and
   execute the coasting control when the required deceleration rate is equal to or less than a predetermined coasting deceleration rate.

4. The vehicle driving assistance apparatus according to claim 3, wherein the electronic control unit is configured to execute the deceleration assistance control when the required deceleration rate is equal to or greater than a predetermined braking deceleration rate that is greater than the predetermined coasting deceleration rate.

5. The vehicle driving assistance apparatus according to claim 3, wherein the electronic control unit is configured to determine that the required deceleration rate is equal to or less than the predetermined coasting deceleration rate when a driver of the own vehicle indicates a deceleration intention in a situation where a front inter-vehicle distance between the own vehicle and a preceding vehicle is shorter than a predetermined front inter-vehicle distance.

6. The vehicle driving assistance apparatus according to claim 3, wherein the electronic control unit is configured to determine that the required deceleration rate is equal to or less than the predetermined coasting deceleration rate when a following vehicle is located close to the own vehicle and the following vehicle is moving at a higher speed than the own vehicle.

7. The vehicle driving assistance apparatus according to claim 1, wherein the deceleration target is at least one of a preceding vehicle located in front of the own vehicle, a traffic light in front of the own vehicle in a moving direction of the own vehicle, a curved road in front of the own vehicle in the moving direction of the own vehicle, and a stop point in front of the own vehicle in the moving direction of the own vehicle.

8. The vehicle driving assistance apparatus according to claim 1, wherein the coasting control is a control of causing the own vehicle to coast by interrupting a transmission path of a driving force from a driving apparatus to driving wheels of the own vehicle.

9. A vehicle driving assistance method for executing a deceleration assistance control of autonomously applying a braking force to an own vehicle to decelerate the own vehicle, and a coasting control of causing the own vehicle to coast, wherein the vehicle driving assistance method comprises steps of:

executing the coasting control when a predetermined coasting condition becomes satisfied in a situation where a deceleration target which creates a need to decelerate the own vehicle, is not detected;

executing the deceleration assistance control when the deceleration target is detected in a situation where the predetermined coasting condition is not satisfied; and determining whether to execute the coasting control depending on driving operation information on a driving operation carried out by an operator of the own vehicle when the deceleration target is detected in a situation where the predetermined coasting condition is satisfied.

10. A non-transitory computer-readable storage medium storing a vehicle driving assistance program which executes a deceleration assistance control of autonomously applying a braking force to an own vehicle to decelerate the own vehicle and a coasting control of causing the own vehicle to coast, wherein the vehicle driving assistance program is configured to:

execute the coasting control when a predetermined coasting condition becomes satisfied in a situation where a deceleration target which creates a need to decelerate the own vehicle, is not detected;

execute the deceleration assistance control when the deceleration target is detected in a situation where the predetermined coasting condition is not satisfied; and determine whether to execute the coasting control depending on driving operation information on a driving operation carried out by an operator of the own vehicle when the deceleration target is detected in a situation where the predetermined coasting condition is satisfied.

* * * * *